Jan. 13, 1953 J. A. MATHIS 2,625,594
DEVICE FOR INHIBITING SLEEP
Filed March 11, 1949
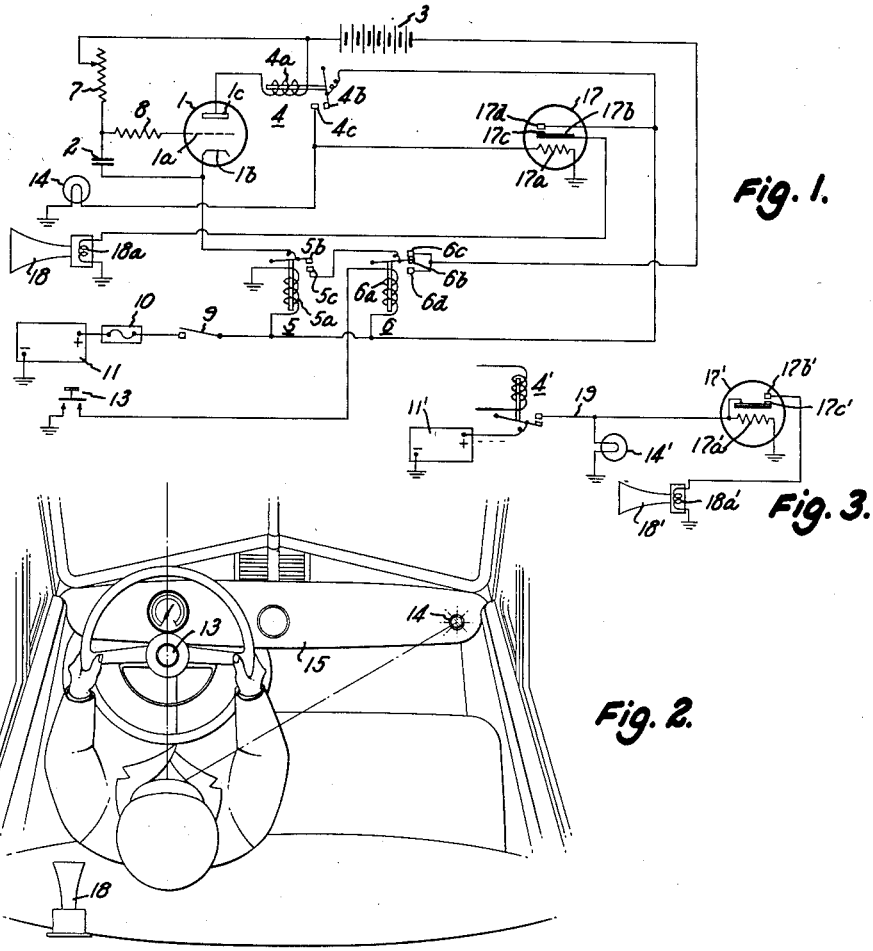
Fig. 1.
Fig. 3.
Fig. 2.
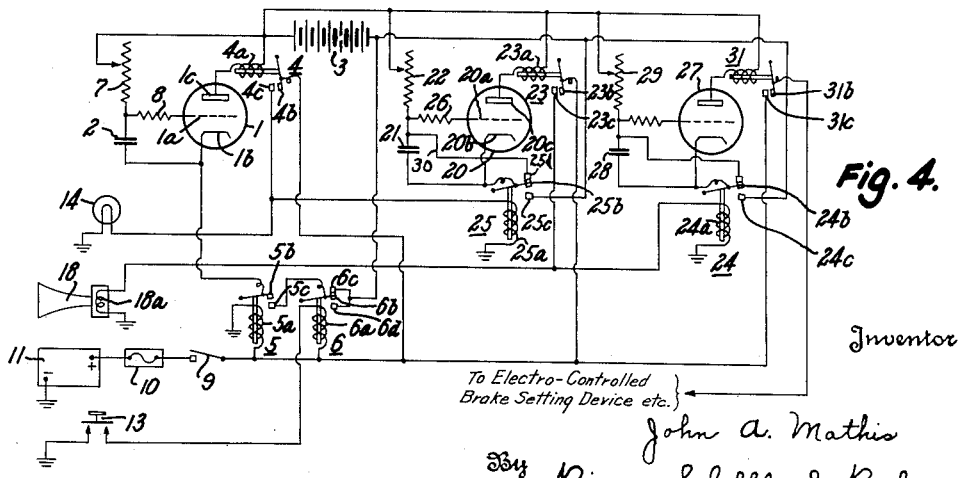
Fig. 4.
To Electro-Controlled
Brake Setting Device etc.
Inventor
John A. Mathis
By Pierce, Scheffler & Parker
Attorneys Patented Jan. 13, 1953

2,625,594

UNITED STATES PATENT OFFICE 2,625,594

DEVICE FOR INHIBITING SLEEP

John A. Mathis, Pinckneyville, Ill.

Application March 11, 1949, Serial No. 80,967

8 Claims. (Cl. 177—311)

The present invention relates in general to alarm systems and in particular to a new method and system designed to prevent operators of road and rail vehicles, aircraft, machines, chemical apparatus and other similar devices from going to sleep at their posts.

To take a specific illustration, most persons today who drive their own automobiles can recall at least one and possibly more occasions where they have seemingly and without warning gone to sleep at the wheel with almost tragic consequences. This type of sleep is not the deep sleep of formal rest but rather a form of auto-hypnosis, which may be defined as a state of intense reverie, that can be brought about in any of several ways. To name a few, it may occur involuntarily as a result of prolonged fixation of sight, or boredom, or fixation of attention on a single, relatively monotonous subject, such as the constant hum of tire treads, or roar of the motor. Such hypnosis may be intensified by suggestion or by past habits of reverie, and its onset may be hastened by fatigue although the latter is not by any means always present. Self-hypnosis can and is often also entered into voluntarily by certain introspective individuals as an escape medium from the ordinary ennui of a work-period, to relieve tedium and make time pass faster.

Whatever the cause, during such periods of auto-hypnosis an individual may deal with ordinary situations which have been repeatedly met and dealt with in the past. Thus, a horseman can fall "asleep" in the saddle without falling from his mount, the driver of a truck can stay on the road for mile after mile while in this trance-like state, and a locomotive engineer can respond to a red signal light and stop his train even though not fully awake.

Unfortunately, however, this period of reverie is not reliably attended by waking ability to reason and act in the light of logic. Automaticity is dependable only so long as an unusual situation does not arise, or a new hazard present itself. If the reverie is not checked, it will ultimately pass into a stage of true sleep wherein response even to stimuli arousing an acute sense of danger, leading to immediate alertness, may come too late to avoid disaster.

The object of this invention is to provide a new method for keeping an individual alert as to what he is doing, and also a specific warning system for putting the method into practice.

In accordance with the new method, the steps sequentially involved are: the periodic generation of a signal, the exhibition of which to one of the externally responsive senses should normally lead to a physiologic response when the individual is fully awake, and the generation of a second signal intended to be responded to by another sense of the individual in the event that he fails to respond to the first signal within a preselected time interval after it has been initiated. Failure to respond to the first signal is interpreted to mean that the individual has entered a state of auto-hypnosis, and the purpose of the second signal is to alarm bring him out of it. Should even the second signal fail to alert the individual, the method also includes after a further time interval, the additional step of initiating an automatic emergency procedure which will apply a more or less extreme remedy suited to the occasion. Thus in the case of an airplane pilot, failure to act upon the second signal might bring about automatic ejection from the plane, or if a locomotive engineer, failure to respond might set the brakes and throttle the power source of the locomotive.

While any two of the five senses can be made to serve the purpose, the three considered most practical are visual, auditory and tactile, the last including touch, pressure, vibration, pain and temperature. The system which is about to be described uses the senses of sight and hearing, first because it has been observed that one of the earliest manifestations of auto-hypnosis is the loss of peripheral vision, and secondly, loud, unpleasant and unusual noises have been found the most effective in arousing persons from a condition of reverie. When a person loses peripheral vision he is said to have "tunnel" or "central" vision remaining. An individual so affected sees straight ahead, or if driving a road vehicle makes minor eye movements in following whatever procedure his situation demands. Thus if a visual signal is located at a point outside of the central visual field of the individual, which field covers an arc of only a few degrees to each side of the line of sight, such signal will be seen by him only if entirely alert. Failure to observe the signal, however, within a preselected time after it appears is then taken as evidence that the individual has or is entering a condition of deep reverie and automatically sets off a signal so loud as to waken him from his condition.

In the accompanying drawing, Fig. 1 is a schematic circuit diagram of a combined visual-aural signal system embodying the invention; Fig. 2 shows how the visual and aural signals would be arranged in the cab of a truck; Fig. 3 is a sub-circuit diagram illustrating a slight modification; and Fig. 4 illustrates a modification of the circuit shown in Fig. 1 to provide for still a third signal which is actuated automatically in the event of failure to take cognizance of the second signal.

Referring now to the drawings and Figs. 1 and 2 in particular, the system is seen to be built around a thyratron tube 1 of the cold cathode type and a condenser 2 arranged in circuit between the grid 1a and cathode 1b of the tube for effecting periodic flow of current in the anode 1c-cathode 1b circuit. The latter includes a "B" battery 3 of the dry cell type rated at 90 volts, coil 4a of relay 4, and the contacts of two relays 5 and 6.

Condenser 2 is charged from battery 3 through a high valued variable resistor 7, having a range of the order of from one to twenty megohms and whose setting is dependent upon the length of the delay desired for periodically establishing the visual signal; the condenser 2 is discharged over grid resistance 8 which may be of the order of 2000 ohms through the grid 1a each time the anode circuit of the thyratron 1 is interrupted.

One side of coil 5a of relay 5 is connected through the ignition switch 9 for the truck motor and a fuse 10 to the +6 volt terminal on the regular car battery 11; the other side of coil 5a is "grounded" to the car frame as is also the —6 volt terminal of battery 11 in accordance with usual wiring practice, and this coil remains energized continuously so long as the ignition switch 9 remains closed.

Coil 6a of relay 6 is likewise connected through switch 9 to the +6 volt battery terminal and ground but the coil circuit is completed through a push button type of switch 13 placed at a location convenient to the driver. In Fig. 2 it will be observed that switch 13 is mounted on the steering wheel of the vehicle but it is understood that the switch may be placed on the floor board for foot operation if such a location is considered more convenient.

The contacts of relay 5 consist of a movable contact 5b secured to the relay armature and a single stationary contact 5c, and the contacts remain closed so long as the coil 5a is energized. Relay 6, however, is provided with a pair of stationary contacts 6c, 6d between which the armature carried contact 6b operates each time that the push button switch 13 is actuated, to energize relay coil 6a.

The contacts of relay 4 include an armature carried contact 4b and a stationary contact 4c. When these contacts are closed, a circuit is completed through them from the +6 volt battery terminal (assuming switch 9 to be closed) to a visual signal, preferably a small red-lensed telltale lamp 14, mounted on the dashboard 15 of the car and located off to one side of the operator's line of sight, which may be considered as being straight ahead, so as to be out of his range of central vision but yet within his normal range of peripheral vision. The lamp 14 can be located above, or below or laterally to either side of the line-of-sight, and an angle of from sixty to ninety degrees from the line-of-sight for the lamp will probably be satisfactory for most individuals. A red light is preferred because this color does not affect night vision and is also bright enough to be seen clearly in daylight.

Closure of the contacts on relay 4 also completes a circuit to the heating coil 17a of a thermostatic relay 17 having a time delay characteristic such that the bimetallic temperature responsive blade member 17b carrying contact 17c does not engage the stationary contact 17d until a predetermined delay period has elapsed. A delay period of from twenty to fifty seconds is usually satisfactory and when the thermostatic switch contacts 17c, 17d finally do close, a circuit is completed through them from the +6 volt battery terminal to the energizing coil 18a of an alarming signal such as a horn 18 or bell mounted in the cab of the vehicle.

*Operation*

The alarm system shown in Figs. 1 and 2 operates in the following manner:

The system is automatically put into operation whenever the driver has his ignition switch 9 turned "on," i. e. closed. Closure of switch 9 energizes relay 5 and its contacts move to and remain in a closed position. Due to the fact that the movable contact 6b of relay 6 is always in contact with either the stationary contact 6c or 6d, except for the brief time required in going from one to the other, it will be seen that a circuit has now been completed for charging condenser 2 from the "B" battery 3 through the variable resistor 7. After a delay period determined by the setting on resistor 7, which period may, for example, be of the order of thirty seconds, the potential on condenser 2 and hence that also on grid 1a of thyratron tube 1 will reach a value sufficiently positive, i. e. 70 volts, to cause the tube to ionize and hence initiate current flow in its anode-cathode circuit. Relay 4 now becomes energized and closes its contacts thus lighting the tell-tale lamp 14, and also simultaneously initiating current flow through the heater coil 17a of thermostatic switch 17.

Assuming that the driver is fully alert, he now is called upon to actuate switch 13 momentarily causing the movable relay contact 6b to break from contact 6c and move in the direction of contact 6d. This opens the cathode-anode circuit of the thyratron, causing the contacts of relay 4 to likewise open and extinguish lamp 14 as well as interrupt the current to the thermostatic heater coil 17a allowing the bimetallic blade 17b to cool to its starting temperature. Also, as soon as relay contact 6b breaks with contact 6c, condenser 2 will be discharged through the grid-cathode circuit of thyratron 1. Upon release of switch 13, contacts 6b, 6c reengage thereby reconnecting the battery 3 to the condenser 2 and restarting the cycle. After the delay period, thyratron 1 reignites and lamp 14 goes on again. The driver again actuates switch 13 momentarily to extinguish the lamp, condenser 2 discharges and the cycle begins once again. Thus each time that lamp 14 flashes on, the driver is called upon to extinguish it by actuating switch 13.

To make the system foolproof, it will be readily apparent from the circuit that the cycle of recharging condenser 2 will be restarted even though the driver should hold the push button switch 13 closed, the only difference being that the charging circuit is then completed through relay contacts 6b—6d rather than through contacts 6b—6c. Also it should be noted that while the variable resistor 7 in the electronic timing circuit provides considerable latitude in the choice of the delay period, the driver cannot interfere with the periodic action of the tell-tale lamp 14. Nor will jiggling of the switch 13 back and forth prevent the system from operating in the intended manner, the most that such action can do being to delay the come-on time of signal lamp 14 by about 5% of the time set for.

Should, however, the driver at any time fail to notice the appearance of the lamp signal 14, which would be the case were he to have entered into a state of deep reverie and hence have lost his peripheral vision, he would not of course be reminded to actuate switch 13 to extinguish the lamp and restart the cycle. Thus current would continue to flow through heater coil 17a, and after a brief period of say twenty seconds following the appearance of the lamp signal 14, switch 17 will close its contacts and set off the auditory signal horn 18. The tone of the horn is preferably very loud as well as unpleasant and when set off is calculated to terminate even the most deep auto-hypnosis thus bringing the driver to his senses almost instantly. Once this has occurred, a driver if he is careful will, in the interest of his own safety as well as the safety of others, bring his vehicle to a stop off the road, shut off the warning system by opening switch 9 and then take at least a short nap before attempting to drive further.

It will be seen from the Fig. 1 circuit that two electric wires are run from the control apparatus, one to the lamp 14 and the other to the horn 18. This will be the usual arrangement when a continuous blast of the horn is desired and the thermostatic relay 17 is mounted within the box housing the batteries, other relays and the thyratron. However, if an intermittent horn blast is preferred, the thermostatic relay can be mounted directly on the horn in which case the circuit connections will be modified slightly as shown in Fig. 3 so that only one wire need be run from the box housing the other components of the control system. With reference to Fig. 3, it will be seen that lamp 14', heater coil 17a' of the thermostatic switch 17' and coil 18a' on horn 18' are all fed in parallel from a common lead 19 which extends through the contacts of relay 4' to the +6 volt terminal of the battery. Thus when relay 4' closes its contacts, lamp 14' which takes a negligible amount of current will be lighted and coil 17a' will begin to heat. After the twenty second limit allowed for the driver to take action, the contacts on the thermostatic switch 17' will close thus setting off the horn 18'. However, the current taken by the latter will lower the current flow through heater coil 17a' with the result that the relay contacts 17b'—17c' open and shut off the horn. Heater coil 17a' immediately begins to draw more current, the contacts reclose and the horn is set off again thus giving rise to repeated blasts from the horn instead of a single, prolonged unpleasantness.

While a horn or bell signal will usually be sufficient to alert the driver, it is of course possible that the individual for whom the safety system is designed will have passed over from a condition to reverie into one of deep sleep in which case not even the loud noise from the horn will awaken him. Also it is of course possible that the individual may be seized with a sudden heart attack or other ailment that would strike him dead or else render him unconscious. To guard against these eventualities, it may be practical for some applications to add one or more additional signal stages arranged in cascade to the first two signals and which would come into operation after a selected delay period following the onset of the second signal to apply a more drastic remedy. If the system, to cite an example, is placed in a vehicle the third signal could be used to initiate application of the brakes and cut off the engine power; or if used to protect the pilot of a fast aircraft, the third signal could be used to eject him from the craft.

Such a system is illustrated in Fig. 4 and will now be described. To simplify explanation, those components which have the same function as in the Fig. 1 circuit have been denoted by the same reference numerals and hence as to these, no further description is considered necessary. The first major difference apparent from comparison of the two systems is that the time delay function performed by the thermostatic relay 17 in Fig. 1 has been replaced by a second thyratron control tube 20 in Fig. 4. This tube which is like in characteristic to tube 1 includes a condenser 21 in circuit with grid 20a charged through a high valued resistor 22, a grid resistor 26 and a signal relay coil 23a in its cathode-anode circuit 20b—20c, the relay contacts 23b—23c serving to complete the energizing circuit from the +6 volt terminal on the battery 11 to the coil 18a in the horn 18 and also to the control relay 24 of the next stage which will be described later. Also included in the cathode-anode circuit of tube 20 are contacts 25b, 25c of relay 25, the coil 25a of this relay being energized from battery 11 whenever relay contacts 4b, 4c close.

As in the Fig. 1 circuit, thyratron tube 1 is rendered periodically conductive in a manner dependent upon the particular delay characteristic imposed by the charging resistor 7 and hence periodically causes closure of relay contacts 4b, 4c thus lighting the signal lamp 14 and simultaneously energizing relay 25. Closure of relay contacts 25b, 25c completes the connection of "B" battery 3 to thyratron 20 and the condenser 21 now begins to take on a charge. After a time interval of say twenty seconds, and assuming the operator has not in the meantime actuated switch 13 which of course causes tube 1 to deionize and open the energizing winding of relay 25 as well as extinguish lamp 14 and discharge condenser 21 through the shunt connection 30 and relay contacts 25b, 25d, the potential on condenser 21 will have reached a positive potential sufficient to cause thyratron tube 20 to "fire" and hence relay 23 becomes energized and sets off the horn 18.

If the blast of the horn is not sufficient to alert the operator, the Fig. 4 system provides for taking a still more drastic step. It will be noted that as soon as horn 18 is set off, relay 24 is energized. This relay has identically the same function as relay 25 and when its contacts 24b, 24c close, a connection is completed from "B" battery 3 to another thyratron tube 27 and the timing condenser 28 associated with the grid circuit thereof begins to charge through the variable high value resistor 29. Tube 27 will then "fire" when the potential on condenser 28 reaches the ionization point of the tube and the control relay 31 in its anode-cathode circuit will be energized. The electrical circuit which is then completed through the relay contacts 31b, 31c, can then be used in any conventional manner to initiate the more drastic control measure such as to set the brakes on the vehicle.

If desired, still other thyratron timed control stages may be added in cascade to follow tube 27 each with a selected delay characteristic. The use of delayed action thyratron type relays to control the timing of the cascaded signal stages as shown in Fig. 4 is somewhat more expensive than the thermostatic timing relay 17 used in the Fig. 1 circuit but may be justified under some conditions in view of the more precise delay action afforded by the timing condensers (21, 28) which are always in a completely discharged state when the timing of any particular signal stage is begun.

In conclusion, I wish it to be understood that the signal systems that have been described for carrying out the principles of the invention are illustrative only and that various changes can hence be made without departing from the spirit and scope of the invention as defined in the appended claims.

I claim:

1. A multiple signal sleep inhibitor device for operators of vehicles, machines, industrial apparatus or the like comprising a grid controlled discharge tube of the thyratron type, a condenser in the grid-cathode circuit of said tube, a charging resistor for said condenser in the anode-grid circuit of said tube for delaying ionization thereof, a signal relay having its energizing winding connected in the anode-cathode circuit of said tube, a signal at the location of the operator controlled through the contacts of said relay, a control relay including a movable contact operable between and engaged with one or the other of a pair of stationary contacts and through either of which said cathode-anode circuit is maintained closed, switch means actuatable by the operator for controlling current flow through the energizing winding of said control relay, delayed action relay means controlled through the contacts of said signal relay, and a second signal at the location of the operator controlled through the contacts of said delayed action relay, said first and second signals being of such characteristic as to appeal to different physiologic senses of the operator.

2. A sleep inhibitor device as defined in claim 1 wherein said delayed action relay is comprised of a thermostatically responsive member and a heater circuit therefor energized through the contacts of said signal relay.

3. A sleep inhibitor device as defined in claim 1 wherein said delayed action relay is comprised of a second grid controlled discharge tube of the thyratron type including delayed charging condenser means in the grid cathode circuit thereof, and a relay in the cathode-anode circuit thereof including a movable contact operable between and engaged with one or the other of a pair of stationary contacts, to alternatively complete a discharge path for said condenser means or close the anode-cathode circuit of said second tube, the energizing winding of said relay being energized through the contacts of said signal relay.

4. A sleep inhibitor device as defined in claim 1 wherein said delayed action relay is comprised of a thermostatically responsive member and a heater element therefor, and means arranging the circuit to said heater element and the circuit to said second signal through the contacts of said delayed action relay for energization in parallel through the contacts of said signal relay.

5. A sleep inhibitor device as defined in claim 1 wherein said first signal is a visual one located at about an angle of 60° or more from the line of sight along which the operator's vision is normally centered but within the area of normal lateral vision as related to said line of sight.

6. In a sleep inhibitor device for operators of vehicles, machines, industrial apparatus or the like, the combination comprising a visual signal located outside of the range of an operator's normal area of central vision but within the range of his normal area of lateral vision as related to a line of sight along which the operator's vision is normally centered, automatic means for periodically establishing said visual signal, means controllable by the operator for terminating said visual signal at any time following each appearance thereof, an additional signal for alarming the operator, and means for automatically establishing said alarming signal in the event of the operator's failure to terminate said visual signal within a predetermined time interval following any onset of said visual signal.

7. A sleep inhibitor device as defined in claim 6 wherein said visual signal is located at an angle of about 60° from the line of sight along which the operator's vision is normally centered.

8. A sleep inhibitor device as defined in claim 6 and which further includes means automatically initiating action of a third emergency control signal at the end of a predetermined time interval following the onset of said alarming signal.

JOHN A. MATHIS.

REFERENCES CITED

The following references are of record in the file of this patent:

UNITED STATES PATENTS

| Number | Name | Date |
|---|---|---|
| 1,080,287 | Levison | Dec. 2, 1913 |
| 1,108,998 | Levison | Sept. 1, 1914 |
| 1,881,878 | Nidy | Oct. 11, 1932 |
| 2,357,122 | Machinist | Aug. 29, 1944 |